United States Patent
Evans et al.

4,038,650
July 26, 1977

[54] FLUID LEVEL DETECTOR AND PROBE ASSEMBLY

[76] Inventors: Martin Evans, 22216 Victory Blvd., Apt. C-309, Woodland Hills, Calif. 91364; James H. Kirkendall, 9509 Casaba, Chatsworth, Calif. 91311

[21] Appl. No.: 621,865

[22] Filed: Oct. 14, 1975

[51] Int. Cl.² .................. G08B 21/00; G02B 5/16
[52] U.S. Cl. .................. 340/244 R; 73/293; 250/227; 340/380; 350/96 B
[58] Field of Search ........... 340/244 R, 244 E, 380, 340/244 C; 250/227; 350/96 B; 137/386; 73/293, 327; 324/65 P

[56] References Cited
U.S. PATENT DOCUMENTS

| | | | |
|---|---|---|---|
| 3,276,004 | 9/1966 | Mayo, Jr. | 340/237 R |
| 3,384,885 | 5/1968 | Forbush | 340/380 X |
| 3,818,470 | 6/1974 | Hirsbrunner et al. | 340/244 R |
| 3,882,887 | 5/1975 | Rekai | 340/244 R X |
| 3,892,305 | 7/1975 | Higgins | 250/227 X |

*Primary Examiner*—John W. Caldwell
*Assistant Examiner*—Daniel Myer
*Attorney, Agent, or Firm*—Jack C. Munro

[57] ABSTRACT

A device for gauging level of a liquid within a container employing an elongated fibrous optic assembly which is connected at one end to a probe which is mounted within the container and at the other end to an electrical control device, the end of the fibrous optic assembly located within the probe being connected to a reflecting prism which functions to reflect light when not in contact with the liquid and does not reflect light when in contact with liquid, means located within the control device responsive to the reflection of light, said means being connected to an annunciator.

15 Claims, 7 Drawing Figures

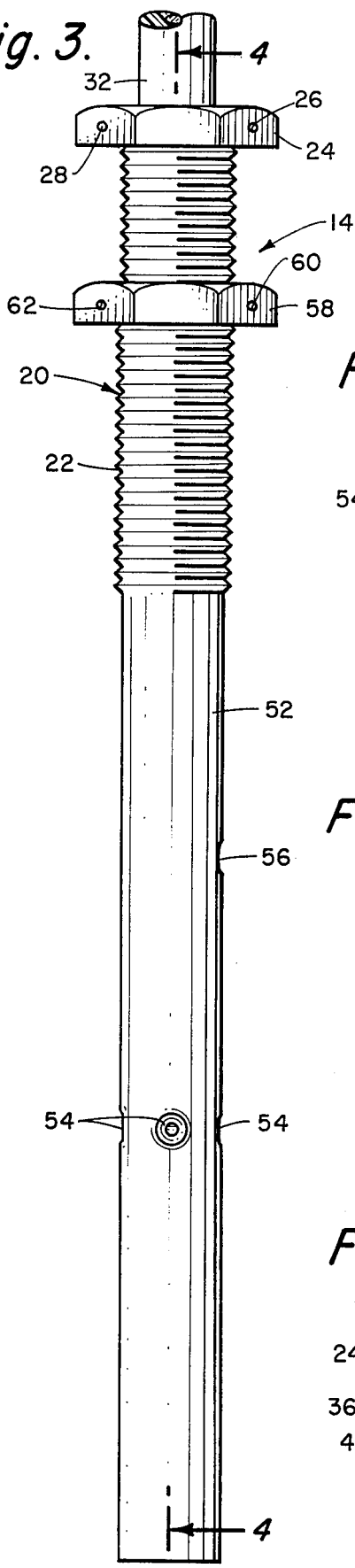
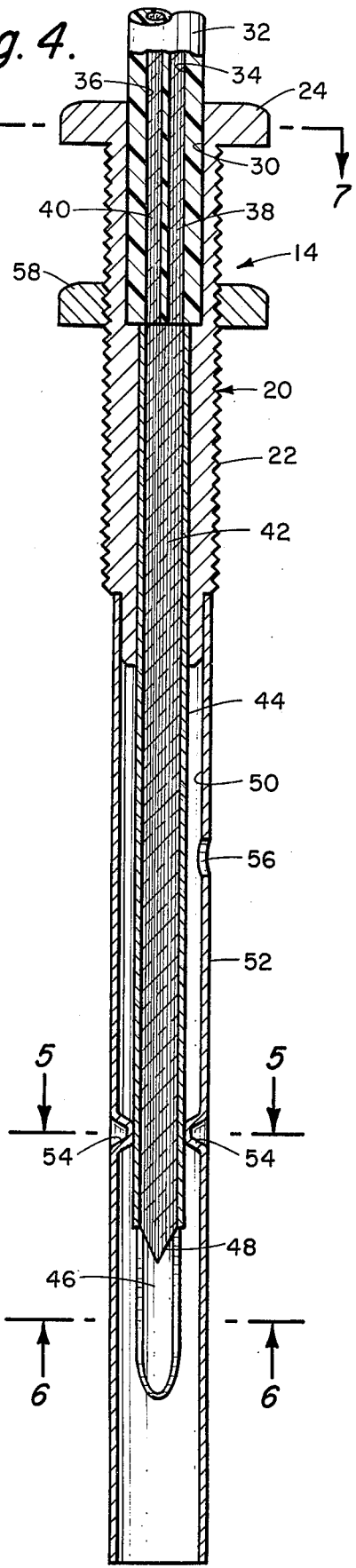
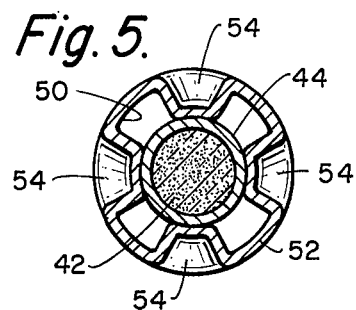
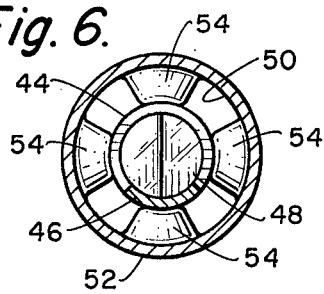
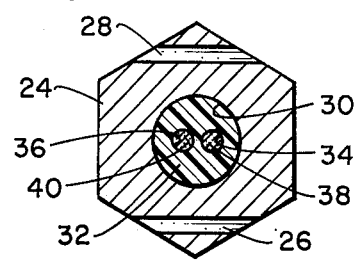

FLUID LEVEL DETECTOR AND PROBE ASSEMBLY

BACKGROUND OF THE INVENTION

The field of this invention relates to a liquid gauging device and more specifically to a liquid gauging device to be employed in conjunction with a predetermined liquid level within a measured container.

The subject matter of this invention is designed in particular to be employed upon large volume containers, such as a gasoline tank truck, or the like. However, it is considered to be within the scope of this invention that this invention could be employed in other fields, such as upon smaller sized containers and not only gasoline type of containers but also any type of liquid containing container.

A gasoline or fuel oil tank truck is a very precisely measured container. At the present time, each tank truck includes a volume calibration system which normally takes the form of a threaded rod extending from the top of the tank truck into the container and upon the threaded rod are located one or more threadable wafers. A calibrating body, usually in the form of Government officials, place a desired amount of liquid within the container (usually between fifteen hundred and twenty-one hundred gallons), and then manually threads the wafer until it contacts the top surface of the liquid. At times there may be two or more wafers established at different points along the threaded rod to establish different gallonages. This wafer or wafers are then fixed and sealed in their established position. If anyone alters the position of the wafers, it is readily apparent by the breaking of the seal.

Anyone ordering product to be transported by the tank truck has the right to inspect these wafers to insure that the person is receiving their number of gallons which that person has ordered. This requires a person to physically climb on top of the tank truck and open the hatch into the tank truck to observe the position of the wafer with respect to the fuel. At the time of opening the hatch, a substantial volume of gas fumes escape into the atmosphere. The amount of gas from a single tank truck escaping into the atmosphere is not a significant amount, but when taken in view of the fact that there are approximately over one hundred and forty thousand tank trucks in the United States at the present time and with every one of these tank trucks having their hatches opened each day a significant amount of gaseous fumes are expelled daily into the atmosphere. The releasing of fumes to the atmosphere is in violation of the Governmental Environmental Protection Agency and the Air Pollution Control Department. The breathing of such gaseous fumes is not particularly desirable from a health standpoint. Also, each time the gaseous fumes are exposed to air there is always the potential danger of fire and such fires have occurred while the tank trucks have been filled within bulk plants.

At the present time, there is a new type of system that is being installed within tank trucks which requires the tank trucks to be filled from the bottom and the hatch covers on the top of the tank truck to be permanently closed. However, there still presents the problem of permitting, in some way, the person receiving the product to know that he is obtaining the purchased amount of product. Therefore, some gauging system must be incorporated into the tank truck which is capable of gauging the quantity of fuel within the tank truck and displaying this amount exteriorly of the tank without requiring the opening of any hatch cover into the tank truck.

In the past, there have been known systems in order to achieve the previously mentioned end result. These past systems have been structured to include some type of float which is movable with respect to the surface of the liquid contained within the tank. However, such floats are movably by mechanical means and it is very common that such floats will stick thereby giving inaccurate readings.

There is a definite need for a device which will be capable of denoting whether a certain quantity of liquid is contained within a tank and also for the measuring instrument to be safe in a hazardous area, maintenance free and a hundred percent reliable over an extended period of time.

SUMMARY OF THE INVENTION

The liquid gauging device of this invention provides for the use of a probe placed within a measured container. Within the probe is located a fibrous optic member which is capable of transmitting light. At the end of the probe is located a reflecting prism. The prism is placed at the point of the desired level of liquid to be contained within the tank. Without any liquid contacting the prism, light is readily reflect back into the fibrous probe. If liquid is in contact with the prism, the light does not reflect back into the probe but is diffused into the mass of liquid. Connected to the fibrous optic member is a light transmitting fibrous member and a light receiving fibrous member. During operation of the device, light is constantly being transmitted to the reflecting prism and if the prism is not in contact with liquid the light is being reflected and being received by the light receiving fibrous member. The light receiving fibrous member is connected to a light detection device which, in turn, is used to activate an annunciator based on whether light is being reflected or not reflected. The structure of the probe located within the container includes a device to eliminate capillary action of the liquid upon the prism. Also, a splash guard surrounds the probe and is spaced therefrom in order to prevent splash of liquid to contact the prism thereby giving a false reading of the actual level of the liquid.

BRIEF DESCRIPTION OF THE DRAWINGS

FIG. 3 is an elevational view of the probe employed within this invention;

FIG. 4 is a cross-sectional view through the probe of this invention taken along line 4—4 of FIG. 3;

FIG. 5 is a cross-sectional view taken along line 5—5 of FIG. 4;

FIG. 6 is a cross-sectional view taken along line 6—6 of FIG. 4; and

FIG. 7 is a cross-sectional view taken along line 7—7 of FIG. 4.

DETAILED DESCRIPTION OF THE SHOWN EMBODIMENT

Figure 1:
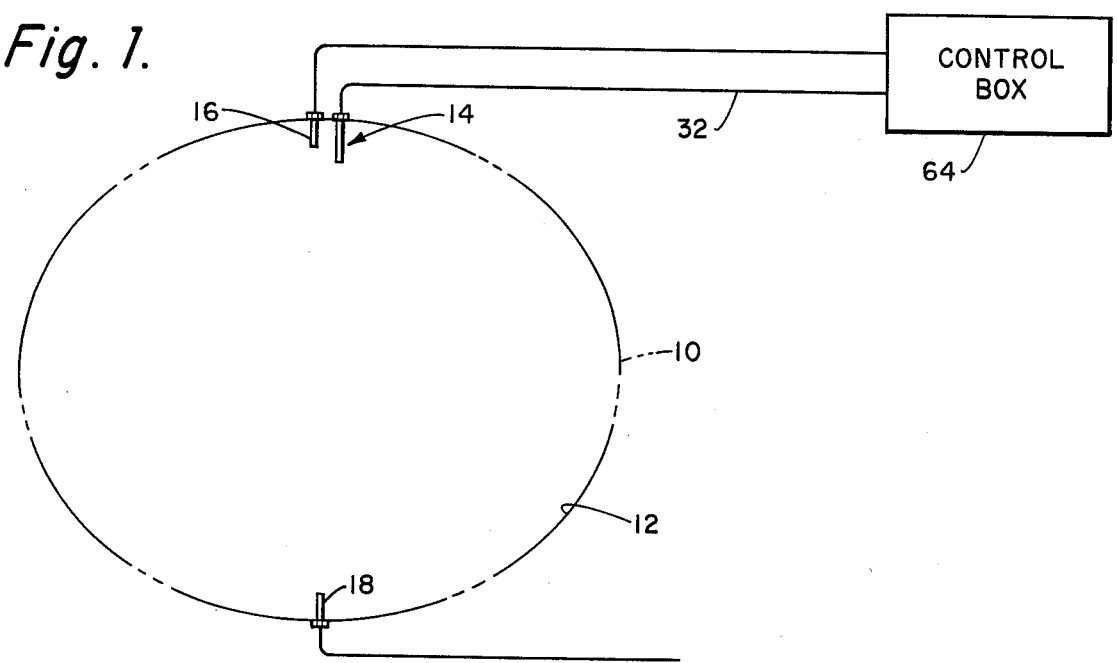
FIG. 1 is an overall schematic view of the fluid gauging detector of this invention.
Figure 2:
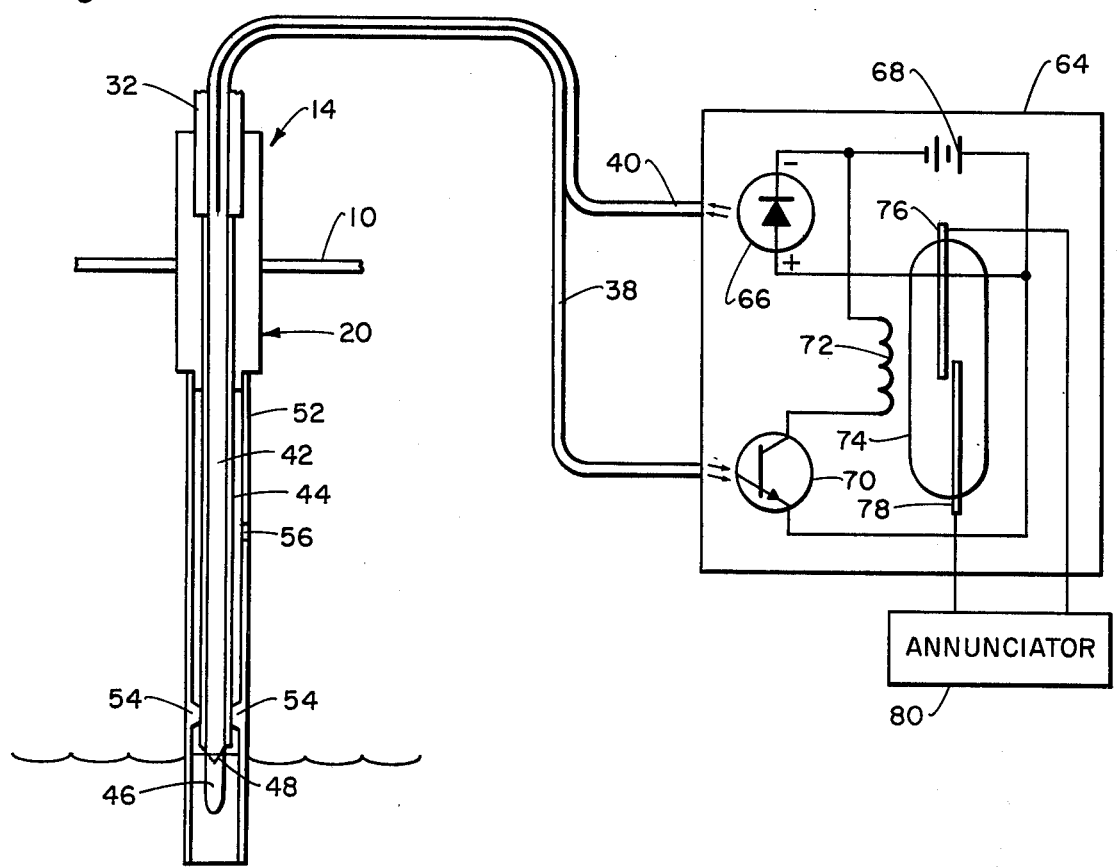
FIG. 2 is a schematic view of a probe showing how such is optically connected to the control mechanism.

Referring particularly to the drawings there is diagramtically shown in FIG. 1 in cross section an oval shaped tank 10 which is similar in shape to the tank usually employed in flue transporting tank trucks. The tank 10 includes an interior chamber 12. Positioned within the chamber 12 and fixedly mounted with respect to the tank 10 through appropriate openings within the tank 10 are a plurality of probes 14, 16 and 18. Each of the probes 14, 16 and 18 are identical in construction and for purposes of explanation, the probe 14 will be described further on in the specification. It is to be understood that probes 16 and 18 are constructed in exactly the same manner with the exception that the probes may vary in longitudinal size, in other words, probes 16 and 18 are shown to be shorter in length than probe 14.

Probe 14 is classified as the "low" probe that is probe 14 because of its longitudinal dimension is located at a lower volumetric level than probe 16. In actual practice, probe 14 could be set to gauge nineteen hundred gallons contained within the chamber 12 while probe 16 was set to gauge 2100 gallons. It is to be understood that the gallonages may readily vary and also there may be only a single probe employed within the chamber 12 or there by be a plurality, or there may be even a greater number of probes employed. Probe 16 also acts as an emergency shut off and will shut down the pumping system of the bulk plant when the high level is reached, thereby eliminating an overfill.

The probe 18 is to be used only to determine if there is any liquid left within the chamber 12. In the past, some tank trucks have returned to the bulk plant to be refilled and it was believed that the chamber 12 was empty. In actual practice, there might be four or five hundred gallons remaining. The filling procedure at the bulk plant requires that the fuel flow at an extremely rapid rate into the chamber 12 in order to minimize the amount of refilling time. The measurement of the gallonages is actually within the bulk plant itself and if the chamber 12 begins to overflow, the filling equipment of the bulk plant still continues to supply fuel into the chamber 12. In some instances, several hundred gallons of fuel has been dispersed on the ground surrounding the tank truck which presents an extremely hazardous situation and will require the complete shutting down of the operations of the bulk plant until the hazard is removed. By the use of the probe 18 the bulk plant operator can readily determine prior to filling whether there is any fuel remaining within the chamber 12. Therefore, the use of the probe 18 is both a safety precaution and shows the customer received his full load.

The probe 14 includes a housing 20 which is exteriorly threaded to form threaded section 22. Integrally connected to the housing 20 at the upper and thereof is a hexagonal shaped nut 24. The nut 24 includes a pair of openings 26 and 28. The openings 26 and 28 are located so as to not communicate with the central interior opening 30 of the nut 24. The function of the openings 26 and 28 will be explained further on in the specification.

The opening 30 extends completely through the housing 20. Fixedly mounted within the upper end of the housing 20 within the opening 30 is an elongated tube 32. The tube 32 may be any length that is desired and will normally be between ten and twenty feet in length. The tube 32 will be flexible and will resemble flexibility of an electrical wire. The tube 32 will normally be constructed of a synthetic material, such as rubber or the like and functions as a protection cover and shield.

Within the tube 32 are a pair of openings 34 and 36. Opening 34 contains a fibrous optic receiving line 38 with opening 36 having located therein a fibrous optic transmission line 40. Both the receiving line 38 and the transmission line 40 are constructed of the same material. Such fibrous optic members are well known and are capable of transmitting light from one end of the line to the other end of the line. Such fibrous optic members are normally constructed of extremely small in cross section, finely drawn optical glass fibers or plastic filaments and there may be as many as several thousand within a quarter inch diameter line. A few of the manufacturers for such fiber optic members are American Optical, Oriental Glass, Inc., International Fiber Optics, Polyoptics, Inc. and Corning Glass Works. A known feature of such fiber optic members is that the light can be transmitted over long distances around corners without an appreciable loss of the power of the light during the transmitting.

Also fixedly mounted within the opening 30 and in abutting contact the free end of the lines 38 and 40 is a main section 42 of fibrous optic probe material. The probe 42 is non-flexible as it is mounted within a protection sleeve 44. The protection sleeve 44 terminates in a narrow elongated segment 46. The function of the segment 46 will be explained further on in the specification.

Fixedly secured to the free end of the fibrous optic member 42 is a reflecting prism 48. The prism 48 is to be constructed of a plastic or glass material and because of its angular surfaces, the prism 48 functions to reflect light. A light that is being transmitted from transmission line 40 into the main member 42 is conducted to the prism 48. If the prism 48 is in contact with the medium having a substantially different light refraction than the prism itself, the surfaces of the prism will function to reflect light and this reflected light is conducted back up the member 42 and is received by the receiving fibrous optic member 38. However, if the prism 48 is in contact with a medium that has substantially similar light refraction capabilities, there will be substantially no reflection of the light and therefore, no light will be received by the receiving member 38. This situation occurs if the prism 48 is in contact with a liquid, such as gasoline or oil. However, if the prism 48 is in contact with air, air has a substantially different light refraction than that of the prism and therefore light would be reflected.

The function of the elongated member 46 is to eliminate capillary action. If a droplet of the liquid remains on the prism 48 although the surface level of the liquid is not at the level of the prism 48, that droplet will cause a diffusion of the light and as a result, no light will be reflected which will give the indication that the probe is in contact with the liquid. In order to avoid this possibility, the member 46 is employed so that the droplet of the liquid will move from the prism 48 and down the member 46 and back into the chamber.

Surrounding the protection sleeve 44 and spaced therefrom, forming an annular gap 50, is a splash and mist guard 52. The length of the splash and mist guard 52 is greater in length than the probe 42 and actually extends some distance beneath the end of the elongated member 46. The splash and mist guard 52 is fixedly secured at one end to the housing 20 and also fixedly secured to the protection sleeve 44 by means of indentations 54. The indentations 54 are merely depressed portions of the splash and mist guard 52 to come into tight contact with the protection sleeve 44 thereby securing the outer end of the guard 52 in a fixed position with respect to the protection sleeve 44.

Located through the wall of the guard 52 is an air vent 56. The function of the air vent 56 is to permit air under atmospheric pressure or whatever pressure is contained within the chamber 12 to be conducted to the area above the prism 48 so that the same pressure will exist on either side of the prism 48.

The function of the splash and mist guard 52 is that during the filling of the chamber 12, the liquid will inherently splash and possibly a heavy mist will form. This splashing and mist will then only occur exteriorly of the guard 52 and that within the interior of the guard 52 the level of the liquid will rise in a non-turbulent manner toward the prism 48. Also, any mist which is produced interiorly of the guard 52 will be condensed on the interior wall of the guard 52 and will return as liquid. Therefore, the liquid gauge located interiorly of the splash and mist guard 52 will give a true reading of the surface level of the liquid.

Mounted on the threaded section 22 is a movable locking nut 58. The nut 58 includes a pair of openings 60 and 62 which are similar to the openings 26 and 28. The initial position of the probe 14 is established by filling the container 12 to the desired level and then physically threading the probe by means of threaded section 22 with respect to the wall of the tank 10. At the time the prism 48 just comes into contact with the surface of the liquid and no reflection of light is seen, the locking nut 58 is then securely tightened to the top of the tank 10. At this time, a thin sealing wire is conducted through one of the openings 26 or 28 and then through one of the other openings 60 or 62 and then to a fixed point located on top of the tank 10. Therefore, if anyone tampers with the position of the probe 14, with respect to the tank 10, the sealing wire (not shown) will be broken and it will be readily evident that the probe has been tampered with.

The tube 32 connects with a control box 64. The control box 64 can take any numerous forms, with the following form being simplified for purposes of discussion and only illustrating a typical construction.

The transmission line 40 connected to a light emitting source, such as light emitting diode 66. It is normally found to be preferable to use an infrared light source or a light source other than that of visible light so as to avoid any possible misreadings if visible light were to activate the device giving an incorrect reading. The light emitting diode 66 is electrically operated from an electrical source 68. The light that is transmitted from the light emitting diode 66 into the transmitting line 40 is then transmitted to the fibrous optic member 42 and to the reflecting prism 48. If the prism 48 is in contact with the liquid contained within the chamber 12, there will be substantially no reflection of the light from the surfaces of the prism 48. However, if the prism 48 is not in contact with the liquid contained within the tank 10, the light will be reflected into the receiving line 38. An infrared detection device 70 is adapted to receive the light from the receiving line 38. This infrared detection device 70 can take any of numerous forms, such as an infrared light emitting diode or a photo-darlington transistor. This infrared detection device 70 is electrically connected to the source 68 of electrical energy and is also connected to a coil 72. Upon light being received (or not received) depending upon how the device is set up to operate), the coil 72 is activated resulting in an applying of a magnetic field to a gas containing glass envelope 74. Within the envelope 74 are mounted a first contact 76 and a second electrical contact 78. These contacts 76 and 78 are constructed of a magnetic material and upon the coil 72 being activated, the contacts 76 and 78 will join together. It is to be noted that it is desirable to place the contacts 76 and 78 within an envelope 74 to thereby eliminate any possibility of any electrical spark being emitted in the area of the tank truck 10.

Upon the electrical contacts 76 and 78 being joined together, these contacts can then be employed to activate some form of an annunciator means 80. This annunciator could be an indicator light, a horn, a bell, or could be a switch which is used to deactivate or activate some other device. In actual practice, a common form of annunciator would be an indicator light. The operator of a gas station, upon receiving a fuel tank truck and prior to discharging of the contents within the chamber 12 into the fuel tanks located within the ground, the operator of the station can employ the device of this invention to connect such to the probe 14 and if the indicator light 80 is activated, then the operator of the station knows that he is receiving the correct amount of fuel because the level of the fuel within the chamber 12 is high enough to be in contact with the prism 48. If the indicator light 80 is not activated, then the operator knows that he is receiving some amount of fuel less than what he has ordered.

It has been found that the device of this invention has a 0.0017 percent accuracy. The probe of this invention, since it does not have any moving parts, will not fail mechanical and has a reliability of one hundred percent as long as the electrical components within the control box 64 operate satisfactorily. Through the use of the glass envelope 74, the switching action is achieved exteriorly of the ambient and therefore, an explosion proof switch is created which means that operation of the device presents no hazard to any environmental gas fumes which may be located around the device.

What is claimed is:
1. A fluid level detector comprising:
a fiber optic assembly comprising an elongated fibrous member having an inner end and an outer end, said member to transmit light from said inner end to said outer end with a portion of the light being reflectable by reflection means from said outer end back to said inner end;
light transmitting means located adjacent said inner end capable of supplying light to said fibrous member;
light detection means located adjacent said inner end capable of detecting the reflected light beam from said inner end;
activation means connected to said light detection means, said activation means being capable of assuming an activating position and a deactivating position, upon said light detection means receiving said reflected light said activation means being located in said activating position;
annunciator means connected to said activation means, said annunciator means being actuated with said activation means in said activating position and
a probe to be located within a container and is positioned to be located adjacent the upper surface of a liquid which has previously been established as a known volumetric amount of the liquid, said probe connected to said outer end of said elongated fibrous member, said probe comprising a housing, said fiber optic assembly passing through an opening within said housing and extending exteriorly of said housing, a splash sleeve attached to said housing and located about said fiber optic assembly, said splash sleeve extending beyond the free end of said fiber optic assembly.

2. The detector as defined in claim 1 wherein:
said fiber optic assembly comprising at said inner end a pair of said elongated fibrous members with one of said members functioning to transmit light and the other of said members functioning to receive light, said pair of members being connected at said outer end to a single fiber optic probe member, said single fiber optic probe member functioning to both transmit and reflect light.

3. The detector as defined in claim 2 wherein:
a light reflecting prism being attached to said single fiber optic probe member, whereby a portion of the transmitted light rays are reflected back due to the light rays contacting the surface of said prism.

4. The detector as defined in claim 1 wherein:
both said light transmitting means and said light detection means being sensitive to infrared light.

5. The detector as defined in claim 1 wherein:
said activation means including a light sensitive diode, said diode being connected to an electrical relay.

6. The detector as defined in claim 5 wherein:
said annunciator means being electrically connected to said relay and is automatically activated upon electrical activation of said relay.

7. A fluid level detector comprising:
a fiber optic assembly comprising an elongated fibrous member having an inner end and an outer end, said member to transmit light from said inner end to said outer end with a portion of the light being reflectable by reflection means from said outer end back to said inner end;
light transmitting means located adjacent said inner end capable of supplying light to said fibrous member;
light detection means located adjacent said inner end capable of detecting the reflected light beam from said inner end;
activation means connected to said light detection means, said activation means being capable of assuming an activating position and a deactivating position, upon said light detection means receiving said reflected light said activation means being located in said activating position;
annunciator means connected to said activation means, said annunciator means being actuated with said activation means in said activating position; and
a probe to be located within a container and is positioned to be located adjacent the upper surface of a liquid which has previously been established as a known volumetric amount of the liquid, said probe connected to said outer end of said elongated fibrous member, said probe comprising a housing, said fiber optic assembly passing through an opening within said housing and extending exteriorly of said housing, a splash sleeve attached to said housing and located about said fiber optic assembly, said splash sleeve extending beyond the free end of said fiber optic assembly, capillary means connected to the free end of said fiber optic assembly, whereby said capillary means being adapted to remove by capillary action any liquid droplets from the end of said fiber optic assembly when said fiber optic assembly is not submerged within liquid.

8. The detector as defined in claim 7 wherein:
a protection sleeve tightly surrounding said fiber optic assembly, said protection sleeve terminating directly adjacent the free end of said fiber optic assembly, a narrow elongated member attached to said protection sleeve at the free end of said fiber optic assembly and extending past the end of said fiber optic assembly, said narrow elongated member functioning as said capillary means.

9. A fluid level detection probe comprising:
a housing;
a fibrous optic assembly including a fibrous optic member attached to said housing with the free end of said fibrous optic member extending exteriorly of said housing;
a splash guard surrounding the free end of said fibrous optic member, said splash guard being attached to said housing, said splash guard extending past the free end of said fibrous optic member, the interior wall of said splash guard being spaced from said fibrous optic member.

10. The probe as defined in claim 9 wherein:
a light reflecting prism being attached to the free end of said fibrous optic member.

11. The probe as defined in claim 10 including:
a capillary wick in contact with said prism, said capillary wick comprising a narrow elongated solid member greater in length than said prism, whereby any droplets of liquid which might remain by capillary action upon said prism are caused to be removed by said capillary wick.

12. The probe as defined in claim 11 including:
a protection sleeve surrounding said fibrous optic member, said splash guard being fixedly mounted to said protection sleeve.

13. A fluid fuel level detector comprising:
a fiber optic assembly comprising an elongated fibrous member having an inner end and an outer end, said member to transmit light from said inner end to said outer end with a portion of the light being reflectable by reflection means from said outer end back to said inner end;
light transmitting means located adjacent said inner end capable of supplying light to said fibrous member;
light detection means located adjacent said inner end capable of detecting the reflected light beam from said inner end;
activation means connected to said light detection, means activation means being capable of assuming an activating position and a deactivating position, upon said light detection means receiving said reflected light said activation means being located in said activating position;
annunciator means connected to said activation means, said annunciator means being actuated with said activation means in said activating position; and
a probe to be located within a container and is positioned to be located adjacent the upper surface of a liquid which has previously been established as a known volumetric amount of the liquid, said probe fixedly connected to said outer end of said elongated fibrous member, said probe comprising a housing, said fiber optic assembly passing through an opening within said housing and extending exteriorly of said housing, mounting means formed upon said housing, said mounting means for securing said housing to a fixed object, said mounting means providing for adjustment of said housing in respect to the fixed object.

14. The detector as defined in claim 12 wherein:

said fiber optic assembly comprising at said inner end a pair of said elongated fibrous members with one of said members functioning to transmit light and the other of said members functioning to receive light, said pair of members being connected at said outer end to a single fiber optic probe member, said single fiber optic probe member functioning to both transmit and reflect light.

15. The detector as defined in claim 14 wherein:

a protection sleeve tightly surrounding said fiber optic assembly, said protection sleeve terminating directly adjacent the free end of said fiber optic assembly, whereby said protection sleeve protects said fiber optic assembly against breakage, damage or direct contact with the liquid to be measured.

* * * * *